May 28, 1968  MASAYA KAWAMURA  3,385,640

ROTARY PLAIN BEARING

Filed Sept. 14, 1964

INVENTOR.
Masaya Kawamura
BY
Wenderoth, Lind & Ponack
Attorneys

3,385,640
ROTARY PLAIN BEARING
Masaya Kawamura, Tokyo, Japan, assignor to Nittoku-Kinzokukogko-Kabushiki-Kaisha, Tokyo, Japan
Filed Sept. 14, 1964, Ser. No. 396,095
1 Claim. (Cl. 308—35)

This invention relates to a rolling contact bearing.

Generally ball bearings and roller bearings are widely used for machines, but there are some defects in that these bearings are rather weak with respect to shock load, and there often occur the failures known as flaking, pitching, breakage of balls and rollers, breakage of inner and outer races, breaking of retainers, creep of the races, brinel wear etc. due to the entry of dust or dirt with the lubricating oil or for other reasons. The causes of these troubles may be many, but the troubles occur often because of the bad rotation of the balls and rollers. Moreover one can say that before the breakage occurs, during the development of the trouble the friction increases. In this situation, if the rotation is continued, the breakage might occur. When the breakage occurs, the small broken pieces may jump out, other bearings may be destroyed, thus the troubles may spread, and if the gears bite broken pieces, the teeth of the gear may be broken, and grave trouble may occur.

An object of the present invention is to prevent these defects just described, and the bearing construction by which this is accomplished will become clear from the following specification and claim, taken together with the accompanying drawings, in which:

Figure 1:
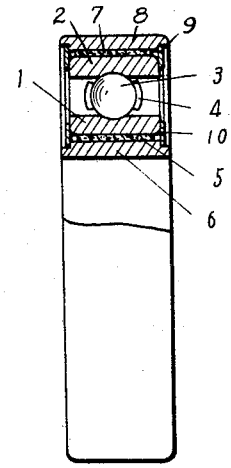
FIG. 1 is a side elevation view, partly in section of the radial type bearing, according to the invention.

FIG. 1 is a side elevation view, partly in section, of a practical embodiment of the radial type bearing according to the present invention having an inner race 1, an outer race 2, 3, and a retainer 4. Within the inner race 1 is a thin bearing metal sleeve 5, and inside of the bearing metal sleeve 5 is an inner bearing ring 6. On the outer side of the outer race 2 is a thin bearing metal sleeve 7, and outside of the bearing metal sleeve 7 is an outer bearing ring 8. In the end surfaces of the inner bearing ring 6 and outer bearing ring 8, are steps, and retainer rings 9 and 10 are fitted and punched therein so that they cannot be removed.

Figure 2:
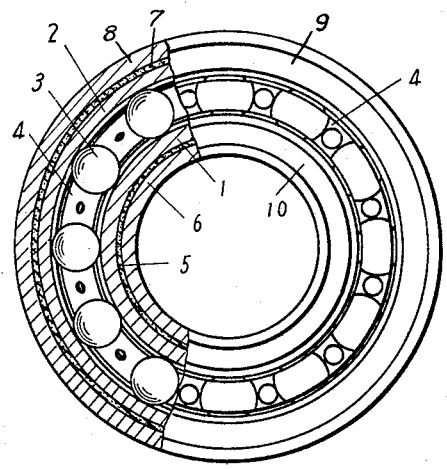
FIG. 2 is a front elevation view, partly in section, of the bearing of FIG. 1.

These bearings, as stated above, can be used instead of the usual rolling contact bearing in a machine, and there is produced thereby a combination rolling and sliding bearing which utilizes in a single bearing the merits of both a rolling contact bearing and a plain bearing. As shown in FIGURE 1 and FIGURE 2, the sliding surfaces are the inner and outer surfaces of the inner bearing metal sleeve 5 and inner and outer surfaces of the outer bearing metal sleeve 7, that is four sliding surfaces of the multi-ring plain bearing are combined with the rolling contact bearing. Which sliding surface of the four sliding surfaces will slide relative to another depends upon the surface condition and lubricating condition, and different sliding motion will occur, but in any case the minimum friction surface of the four surfaces slides at maximum speed and the relative rotation of the other parts will be distributed among the other relatively rotating parts and each will rotate at a slower relative speed.

Usually the sliding of the outer surface of the outer race or inner surface of the inner race is called "creep." Because of creep, the journal and shaft or inner and outer races may wear and be heated, colored, and may seize, and at last the bearing may be destroyed. It can be said this invention utilizes the fact that the rolling contact bearing might easily creep. Generally in the case of rolling contact bearing there is a critical load and critical velocity that cannot be exceeded.

This invention increases the critical load and velocity due to the combination of the rolling contact and plain bearing contact, i.e. during the rotation of the rolling contact bearing, the plain bearings rotate. How the plain bearings rotate depends upon the conditions, but the rolling contact bearing portion will run at a rotating speed as much as $\frac{1}{2}-\frac{1}{5}$ of the speed of the usual rolling contact bearing. Therefore one can increase enormously the life of the rolling contact bearing.

On the other hand, if the ball or roller of the rolling contact bearing bites some obstacle that flows into its lubricating oil the usual rolling contact bearing might break or there might be a seizure of the balls or rollers and grave damage might result, in the bearing of this invention if the rolling contact bearing stops, the plain bearings would continue sliding, therefore trouble cannot happen, and if the obstacles flow out of the roller bearing with the lubricating oil, the rolling contact bearing recovers its function, begins rotation, and the sliding speed of the sliding surface decreases and the multi-ring plain bearing rotates at a speed that is usual under the conditions.

Figure 3:
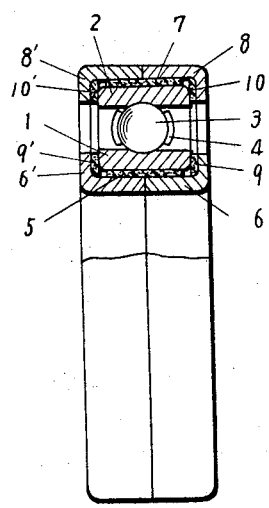
FIG. 3 is a side elevation view, partly in section of another practical embodiment of the bearing of this invention.
Figure 4:
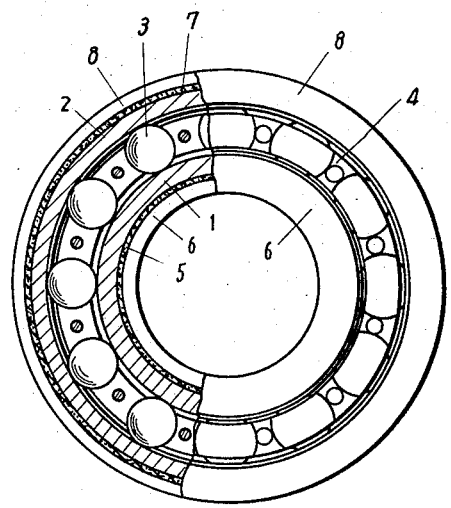
FIG. 4 is a front elevation view, partly in section, of the bearing of FIG. 3.

FIG. 3 shows another practical embodiment. In the inside of the inner race 1 of the ball bearing are assembled bearing metal sleeve 5 and bearing metal washers 9 and 9' which support the thrust force, and on the outside of the outer race 2 are bearing metal sleeve 7 and thrust washers 10 and 10'. To support these bearing metal sleeves and washers, inner bearing rings 6 and 6' and outer bearing rings 8 and 8' are provided. Said inner rings and outer rings are divided in half at the center plane, and are assembled as shown in FIG. 3. With this construction heavy thrust force is supported by the bearing metal washers 9, 9', 10, 10', the four relatively slidable surfaces act as a multi-ring thrust plain bearing, and the bearing metal sleeves 5 and 7 act as four layers of a multi-ring radial plain bearing and help the rotation of the ball bearing. The inner rings 6 and 6' and outer rings 8 and 8' are made of soft steel, which can be produced by cutting or press work. And bearing metal sleeves 5 and 7 and bearing metal washers 9 and 10 are produced from for example 0.5 mm. thick cold rolled thin plate by press work. The production cost will be very low. If it is required, oil grooves might be cut in the bearing metal parts or contacting inner and outer races or inner and outer rings, to enable the lubricating oil to flow easily. In some cases there can be used Teflon or other synthetic resin material instead of bearing metal.

Further more for the thrust bearing of the rolling contact bearing, the small bore washer or large bore washer are supported by a bearing metal washer concentric about a common axis, so that the device is a combination of a thrust rolling contact bearing and thrust plain bearing.

As stated above, this invention, which combines the rolling contact bearing and plain bearing, has the merit of a rolling contact bearing that it is a low friction bearing, and at the same time has the merit of a multi-ring plain bearing that has good shock resistance. By using this bearing one can achieve high rotating velocities and loads that can not be sustained by conventional bearings. For example in the case of a super high speed rotating turbine, if the rolling contact bearing is broken, the bearing might seize so heavily that the bearing will melt, and if the rotor parts contact the stator parts, the turbine might blow out, and serious damage might occur. Usually the rolling contact bearing of a rotating body that rotates over 20,000 r.p.m. has these dangerous defects. But in the present invention not only does the rolling contact bearing have an increased life, but if the rolling contact bearing has trouble, the plain bearings will slide, and no serious damage, such as bearing melt, will occur, so that the rotating part is held in the center position of the bearing and does not contact the stator parts.

In short, the superior quality bearing of the present invention will be very useful in industry, scientific and engineering fields.

What is claimed is:

1. A combined plain and rotatable bearing comprising an inner bearing ring adapted to be attached to one rotatable member, at least one bearing metal sleeve concentric with and in bearing engagement with said inner ring, an inner race concentric with and in bearing egagement with said bearing metal sleeve, a plurality of rotatable elements rolling on said inner race, an outer race concentric with said inner race and holding said rotatable elements in engagement with said inner race, at least one further bearing metal sleeve concentric with and in bearing engagement with said outer race, and an outer bearing ring concentric with and in bearing engagement with said further bearing metal sleeve and being adapted to be attached to another rotatable member rotatable relative to said one rotatable member, said bearing metal sleeves, bearing rings and races being relatively rotatable with respect to the elements with which they are in contact.

References Cited

UNITED STATES PATENTS

| | | |
|---|---|---|
| Re. 15,058 | 3/1921 | Heina. |
| 1,494,695 | 5/1924 | McCluskey _____ 308—183 |
| 1,687,755 | 10/1928 | Foley _____ 308—183 |
| 2,187,307 | 1/1940 | Friend. |
| 2,497,403 | 2/1950 | Gaver _____ 308—38 X |
| 2,704,230 | 3/1955 | Roschlau. |
| 2,872,254 | 2/1959 | McNaughton et al. ____ 308—35 |
| 3,129,904 | 4/1964 | Hanson _____ 308—35 X |
| 3,168,359 | 2/1965 | Murphy _____ 308—174 |

FOREIGN PATENTS

| | | |
|---|---|---|
| 916,738 | 8/1954 | Germany. |

MARTIN P. SCHWADRON, *Primary Examiner.*

FRANK SUSKO, *Examiner.*

R. F. HESS, *Assistant Examiner.*